United States Patent
Boggarapu et al.

(10) Patent No.: US 10,838,754 B2
(45) Date of Patent: Nov. 17, 2020

(54) VIRTUALIZED SYSTEMS HAVING HARDWARE INTERFACE SERVICES FOR CONTROLLING HARDWARE

(71) Applicant: Nutanix, Inc., San Jose, CA (US)

(72) Inventors: Anil Kumar Boggarapu, Bangalore (IN); Rabi Shanker Guha, Milpitas, CA (US); Raghu Prasad Rapole, Telangana (IN)

(73) Assignee: Nutanix, Inc., San Jose, CA (US)

( * ) Notice: Subject to any disclaimer, the term of this patent is extended or adjusted under 35 U.S.C. 154(b) by 291 days.

(21) Appl. No.: 15/965,584

(22) Filed: Apr. 27, 2018

(65) Prior Publication Data

US 2019/0332412 A1 Oct. 31, 2019

(51) Int. Cl.
*G06F 9/455* (2018.01)
*G06F 9/50* (2006.01)
*G06F 9/54* (2006.01)

(52) U.S. Cl.
CPC ........ *G06F 9/45558* (2013.01); *G06F 9/4552* (2013.01); *G06F 9/5077* (2013.01); *G06F 9/54* (2013.01); *G06F 2009/45583* (2013.01); *G06F 2009/45591* (2013.01); *G06F 2009/45595* (2013.01)

(58) Field of Classification Search
CPC ...... G06F 9/45558; G06F 9/5077; G06F 9/54; G06F 2009/45583; G06F 2009/45591; G06F 2009/45595
See application file for complete search history.

(56) References Cited

U.S. PATENT DOCUMENTS

| | | | |
|---|---|---|---|
| 7,299,463 B2 | 11/2007 | Brannock et al. |
| 7,444,386 B2 | 10/2008 | Jensen et al. |
| 8,549,518 B1 | 10/2013 | Aron et al. |
| 8,601,473 B1 | 12/2013 | Aron et al. |
| 8,683,206 B2 | 3/2014 | Sarkar et al. |
| 8,789,035 B2 | 7/2014 | Mccarthy et al. |
| 8,850,130 B1 | 9/2014 | Aron et al. |
| 9,223,563 B2 | 12/2015 | Stenfort et al. |
| 9,235,404 B2 | 1/2016 | Cavalaris et al. |
| 9,367,195 B1 | 6/2016 | Rabe et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Jacob D Dascomb
(74) *Attorney, Agent, or Firm* — Dorsey & Whitney LLP

(57) ABSTRACT

Examples described herein provide for hardware interface services in virtualized systems. The hardware interface services may receive a vendor-agnostic command to control a particular hardware component. The particular hardware component may be identified, for example, by its location (e.g., physical and/or logical location or other identification) in the virtualized system. The hardware interface services described herein may identify a hardware component type (e.g., vendor, serial number, model number, etc.) based on the location provided. The hardware interface services may translate the vendor-agnostic command to a command specific for the identified hardware component.

29 Claims, 4 Drawing Sheets

(56) References Cited

U.S. PATENT DOCUMENTS

| | | | |
|---|---|---|---|
| 9,449,008 | B1 | 9/2016 | Oikarinen et al. |
| 9,471,784 | B1 | 10/2016 | Marr et al. |
| 9,565,207 | B1 | 2/2017 | Marr et al. |
| 9,772,866 | B1 | 9/2017 | Aron et al. |
| 10,467,163 | B1* | 11/2019 | Malwankar ........... G06F 3/0635 |
| 10,642,603 | B2 | 5/2020 | Olderdissen et al. |
| 2003/0066062 | A1 | 4/2003 | Brannock et al. |
| 2003/0070001 | A1 | 4/2003 | Belknap et al. |
| 2003/0217358 | A1 | 11/2003 | Thurston et al. |
| 2004/0034861 | A1 | 2/2004 | Ballai |
| 2004/0225775 | A1 | 11/2004 | Pellegrino et al. |
| 2004/0230963 | A1 | 11/2004 | Rothman et al. |
| 2004/0261086 | A1 | 12/2004 | Jensen et al. |
| 2006/0048001 | A1 | 3/2006 | Honda et al. |
| 2006/0129972 | A1 | 6/2006 | Tyburski et al. |
| 2006/0179294 | A1 | 8/2006 | Chu et al. |
| 2008/0089682 | A1 | 4/2008 | Sylvester et al. |
| 2008/0244553 | A1 | 10/2008 | Cromer et al. |
| 2009/0172252 | A1 | 7/2009 | Tomlin et al. |
| 2009/0326909 | A1 | 12/2009 | Flack et al. |
| 2010/0202450 | A1 | 8/2010 | Ansari et al. |
| 2010/0262749 | A1 | 10/2010 | Frydman et al. |
| 2011/0219359 | A1 | 9/2011 | Gupta |
| 2011/0231864 | A1 | 9/2011 | Raj et al. |
| 2012/0124572 | A1 | 5/2012 | Cunningham et al. |
| 2012/0166693 | A1 | 6/2012 | Weinstock et al. |
| 2012/0179932 | A1 | 7/2012 | Armstrong et al. |
| 2012/0204142 | A1 | 8/2012 | Rubenstein et al. |
| 2012/0246632 | A1 | 9/2012 | Lupu et al. |
| 2012/0311548 | A1 | 12/2012 | Ko et al. |
| 2013/0055259 | A1* | 2/2013 | Dong ................... G06F 13/102 718/1 |
| 2013/0074061 | A1 | 3/2013 | Averbuch et al. |
| 2013/0185433 | A1 | 7/2013 | Zhu et al. |
| 2013/0227543 | A1 | 8/2013 | Chen |
| 2013/0346973 | A1 | 12/2013 | Oda et al. |
| 2014/0082142 | A1 | 3/2014 | Geffin |
| 2014/0187173 | A1 | 7/2014 | Partee |
| 2014/0281577 | A1 | 9/2014 | Nicholes |
| 2014/0304718 | A1 | 10/2014 | Gambardella et al. |
| 2015/0106496 | A1* | 4/2015 | Tsao .................... G06F 11/2094 709/223 |
| 2015/0243140 | A1 | 8/2015 | Barrett |
| 2015/0277969 | A1 | 10/2015 | Strauss et al. |
| 2016/0055167 | A1 | 2/2016 | Vidwans et al. |
| 2016/0092204 | A1 | 3/2016 | Katkere et al. |
| 2016/0092533 | A1 | 3/2016 | Shank |
| 2016/0275772 | A1 | 9/2016 | Apcar |
| 2016/0357546 | A1 | 12/2016 | Chang et al. |
| 2016/0378532 | A1 | 12/2016 | Vincent et al. |
| 2017/0068527 | A1 | 3/2017 | Wang et al. |
| 2017/0147322 | A1 | 5/2017 | Vopni et al. |
| 2017/0344400 | A1 | 11/2017 | Birke et al. |
| 2018/0088639 | A1 | 3/2018 | Remis et al. |
| 2018/0101245 | A1 | 4/2018 | Sewlochan et al. |
| 2018/0307517 | A1* | 10/2018 | Devendran ........... G06F 9/5077 |
| 2018/0349161 | A1* | 12/2018 | Jain ....................... G06F 13/102 |
| 2019/0132815 | A1* | 5/2019 | Zampini, II ......... G06Q 10/067 |
| 2019/0220271 | A1 | 7/2019 | Olderdissen et al. |
| 2019/0332409 | A1 | 10/2019 | Fried-gintis et al. |
| 2019/0332412 | A1 | 10/2019 | Boggarapu et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, Ignacio et al. "Curator: Self-Managing Storage for Enterprise Clusters"; University of Washington; published Mar. 2017; pp. all.

U.S. Appl. No. 15/821,606, entitled "Managing Firmware in Distributed Computing Systems", filed Nov. 22, 2017 (PAT-168), pp. all.

U.S. Appl. No. 15/821,624, entitled "Managing Concurrent Firmware Operations in Distributed Computing Systems", filed Nov. 22, 2017 (PAT-262), pp. all.

U.S. Appl. No. 15/821,646, entitled "Scheduling Firmware Operations in Distributed Computing Systems", filed Nov. 22, 2017 (PAT-261), pp. all.

U.S. Appl. No. 15/872,792, entitled "Scheduling Upgrades in Distributed Computing Systems", filed Jan. 16, 2018, pp. all.

Apple Support: "Update the IOS on Your iPhone, iPad, or iPod Touch", <https://support.apple.com/en-au/HT2042014>, published Sep. 19, 2017, captured Nov. 21, 2017, Sep. 19, 2017, pp. all.

DMTF: DMTF "Distributed Management Task Force, Inc."; https://www.dmtf.org/standards/redfish; captured Nov. 21, 2017 @ 8:43 am; pp. all.

Krutov, et al., "Deploying Flex System in a Bladecenter Environment"; Lenovo Press, Apr. 2015, pp. 1-132.

Microsoft: "Get Started With Windows Server Update Services (WSUS)", captured 2017, pp. all.

Wikipedia: "Manifest File", <https://en.wikipedia.org/w/index.php?title=Manifest_file&oldid=786852577>, published Jun. 22, 2017, captured on Nov. 21, 2017, pp. all.

U.S. Appl. No. 15/963,533, titled "Identification and Storage of Logical to Physical Address Associations for Components in Virtualized Systems", filed Apr. 26, 2018, pp. all.

U.S. Appl. No. 16/864,512 titled "Scheduling Upgrades in Distributed Computing Systems", filed May 1, 2020, pp. all.

* cited by examiner

VIRTUALIZED SYSTEMS HAVING HARDWARE INTERFACE SERVICES FOR CONTROLLING HARDWARE

TECHNICAL FIELD

Examples described herein relate to virtualized and/or distributed computing systems. Examples of computing systems utilizing an upgrade manager to facilitate software upgrades of computing node(s) in the system are described.

BACKGROUND

A virtual machine (VM) generally refers to a software-based implementation of a machine in a virtualization environment, in which the hardware resources of a physical computer (e.g., CPU, memory, etc.) are virtualized or transformed into the underlying support for the fully functional virtual machine that can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine may not be utilized to perform useful work. This may be wasteful and inefficient if there are users on other physical machines which are currently waiting for computing resources. Virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Virtualized and/or other distributed computing systems may utilize a variety of hardware components (e.g., lights, sensors, disks). The hardware components may be provided by a myriad of vendors and may have varying requirements for interfacing with the hardware components (e.g., commands and/or syntax used to control the hardware components).

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
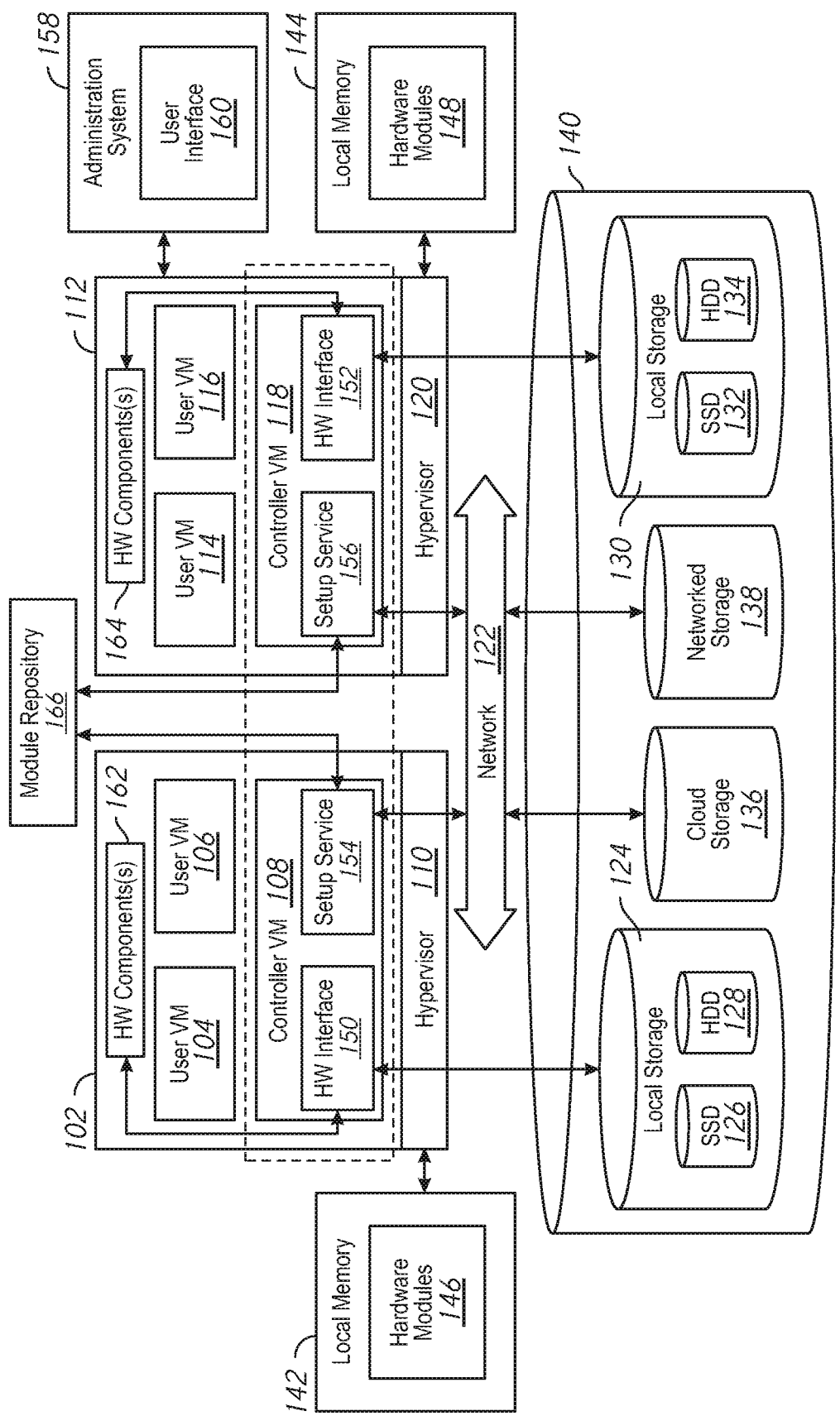
FIG. 1 is a block diagram of a distributed computing system according to an embodiment.

Certain details are set forth herein to provide an understanding of described embodiments of technology. However, other examples may be practiced without various of these particular details. In some instances, well-known virtualized and/or distributed computing system components, circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Generally, operating systems used in computing nodes of a virtualized system may contain vendor-specific code for controlling various hardware components used by the virtualized system. Providing vendor-specific code for controlling hardware components in an operating system may, however, be disadvantageous because it may slow and/or delay the ability to add new hardware components and/or new vendors. For example, if vendor-specific code to control hardware components is contained in the operating system of a computing node and/or of a virtual machine, then to add support for a new hardware component and/or a new vendor, it may be necessary to update the operating system of the computing node and/or virtual machine. Updating the operating system may undesirably render one or more computing nodes unavailable for a period of time and/or slow operation of a virtualized system.

Accordingly, examples described herein provide for hardware interface services in virtualized systems. The hardware interface services may receive a vendor-agnostic command to control a particular hardware component. The particular hardware component may be identified, for example, by its location (e.g., physical and/or logical location or other identification) in the virtualized system. The hardware interface services described herein may identify a hardware component type (e.g., vendor, serial number, model number, etc.) based on the location provided. The hardware interface services may translate the vendor-agnostic command to a command specific for the identified hardware component. For example, the hardware interface services may return a command formatted and using a syntax expected by the identified hardware component. In this manner, adding new hardware components (e.g., including new vendors, such as new original equipment manufacturers (OEMs) may be easier and/or faster in some examples. Moreover, standard interfaces may be provided which may expose vendor-specific features to operating systems of computing nodes described herein. Hardware interface services described herein may provide a common framework which may be used by multiple vendors to expose hardware-related functionalities to operating systems of computing nodes in a virtualized system. Supporting new vendors may accordingly be easier and may not impact code or other support for other vendors. Moreover, vendors may implement vendor-specific modules to be accessed and used by hardware interface services described herein without access to operating system code running on the computing nodes. This may facilitate development of hardware support for virtualized systems described herein.

FIG. 1 is a block diagram of a virtualized computing system, arranged in accordance with examples described herein. The virtualized computing system (e.g., distributed computing system) of FIG. 1 generally includes the computing node 102 and the computing node 112 and the storage 140 connected to the network 122. The network 122 may be any type of network capable of routing data transmissions from one network device (e.g., the computing node 102, the computing node 112, and the storage 140) to another. For example, the network 122 may be a local area network (LAN), wide area network (WAN), intranet, Internet, or a combination thereof. The network 122 may be a wired network, a wireless network, or a combination thereof.

The storage 140 may include the local storage 124, the local storage 130, the cloud storage 136, and the networked storage 138. The local storage 124 may include, for example, one or more SSDs 126 and one or more HDDs 128. Similarly, the local storage 130 may include the SSD 132 and the HDD 134. The local storage 124 and the local storage 130 may be directly coupled to, included in, and/or accessible by a respective computing node 102 and/or computing node 112 without communicating via the network 122. Other nodes, however, may access the local storage 124 and/or the local storage 130 using the network 122. The cloud storage 136 may include one or more storage servers that may be stored remotely to the computing node 102 and/or the computing node 112 and accessed via the network 122. The cloud storage 136 may generally include any type of storage device, such as HDDs SSDs, or optical drives. The networked storage 138 may include one or more storage devices coupled to and accessed via the network 122. The networked storage 138 may generally include any type of storage device, such as HDDs SSDs, or optical drives. In various embodiments, the networked storage 138 may be a storage area network (SAN). The computing node 102 is a computing device for hosting VMs in the distributed computing system according to the embodiment. The computing node 102 may be, for example, a server computer, a laptop computer, a desktop computer, a tablet computer, a smart phone, or any other type of computing device. The computing node 102 may include one or more physical computing components (e.g., hardware components).

Accordingly, computing nodes described herein may include hardware components—such as HW component(s) 162 and HW component(s) 164 shown in FIG. 1. Hardware components may include, but are not limited to, processor(s), sensor(s) (e.g., fan speed sensors, temperature sensors), lights (e.g., one or more light emitting diodes (LEDs), memory devices, and/or disks. Local storage may in some examples include one or more of the hardware components—such as local storage 124 and/or local storage 130.

The computing node 102 is configured to execute the hypervisor 110, the controller VM 108, and one or more user VMs, such as user VMs 104, 106. The user VMs including user VM 104 and user VM 106 are VM instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any number may be implemented. User VMs may generally be provided to execute any number of applications which may be desired by a user.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 118) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 108 and/or the controller VM 118, may provide services for the user VMs in the computing node. As an example of functionality that a controller VM may provide, the controller VM 108 may provide virtualization of the storage 140. Controller VMs may provide management of the distributed computing system according to the embodiment. Examples of controller VMs may execute a variety of software and/or may manage (e.g., serve) the I/O operations for the hypervisor and VMs running on that node. In some examples, a SCSI controller, which may manage SSD and/or HDD devices described herein, may be directly passed to the CVM, e.g., leveraging VM-Direct Path. In the case of Hyper-V, the storage devices may be passed through to the CVM.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. The hypervisor 120 may be included the computing node 112 to access, by using a plurality of user VMs, a plurality of storage devices in a storage pool. In the embodiment of FIG. 1, the hypervisor 120 may be a different type of hypervisor than the hypervisor 110. For example, the hypervisor 120 may be Hyper-V, while the hypervisor 110 may be ESX(i).

The controller VM 118 may include HW interface 152 and setup service 156. The HW interface 152 and setup service 156 in the controller VM 118 may be implemented similarly to analogous components described above with respect to the controller VM 108.

Controller VMs, such as the controller VM 108 and the controller VM 118, may each execute a variety of services and may coordinate, for example, through communication over network 122. Namely, the controller VM 108 and the controller VM 118 may communicate with one another via the network 122. By linking the controller VM 108 and the controller VM 118 together via the network 122, a distributed network of computing nodes including computing node 102 and computing node 112, can be created.

Services running on controller VMs may utilize an amount of local memory to support their operations. For example, services running on the controller VM 108 may utilize memory in local memory 142. Services running on the controller VM 118 may utilize local memory 144. The local memory 142 and the local memory 144 may be shared by VMs on computing node 102 and computing node 112, respectively, and the use of the local memory 142 and/or the local memory 144 may be controlled by hypervisor 110 and hypervisor 120, respectively. Moreover, multiple instances of the same service may be running throughout the distributed system—e.g. a same services stack may be operating on each controller VM. For example, an instance of a service may be running on the controller VM 108 and a second instance of the service may be running on the controller VM 118.

Generally, controller VMs described herein, such as the controller VM 108 and the controller VM 118 may be employed to control and manage any type of storage device, including all those shown in the storage 140 of FIG. 1, including the local storage 124 (e.g., SSD 126 and HDD 128), the cloud storage 136, and the networked storage 138. Controller VMs described herein may implement storage controller logic and may virtualize all storage hardware as one global resource pool (e.g., storage 140) that may provide reliability, availability, and performance. IP-based requests are generally used (e.g., by user VMs described herein) to send I/O requests to the controller VMs. For example, the user VM 104 and the user VM 106 may send storage requests the controller VM 108 using an IP request. Controller VMs described herein, such as the controller VM 108, may directly implement storage and I/O optimizations within the direct data access path.

Note that controller VMs are provided as virtual machines utilizing hypervisors described herein—for example, the controller VM 108 is provided behind the hypervisor 110. Since the controller VMs running "above" the hypervisors examples described herein may be implemented within any virtual machine architecture, the controller VMs may be used in conjunction with generally any hypervisor from any virtualization vendor.

Virtual disks (vDisks) may be structured from the storage devices in storage 140, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 108 may expose one or more vDisks of the storage 140 and may mount a vDisk on one or more user VMs, such as user VM 104 and/or user VM 106.

During operation, user VMs (e.g., user VM 104 and/or user VM 106) may provide storage input/output (I/O) requests to controller VMs (e.g., the controller VM 108 and/or the hypervisor 110). Accordingly, a user VM may provide an I/O request to a controller VM as an iSCSI and/or NFS request. Internet Small Computer System Interface (iSCSI) generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File System (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, user VMs described herein may provide storage requests using an IP based protocol. The storage requests may designate the IP address for a controller VM from which the user VM desires I/O services. The storage request may be provided from the user VM to a virtual switch within a hypervisor to be routed to the correct destination. For examples, the user VM 104 may provide a storage request to hypervisor 110. The storage request may request I/O services from the controller VM 108 and/or the controller VM 118. If the request is to be intended to be handled by a controller VM in a same service node as the user VM (e.g., the controller VM 108 in the same computing node as user VM 104) then the storage request may be internally routed within computing node 102 to the controller VM 108. In some examples, the storage request may be directed to a controller VM on another computing node. Accordingly, the hypervisor (e.g., hypervisor 110) may provide the storage request to a physical switch to be sent over a network (e.g., network 122) to another computing node running the requested controller VM (e.g., computing node 112 running the controller VM 118).

Accordingly, controller VMs described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks.

Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

Examples of systems described herein may include one or more administrator systems, such as admin system 158 of FIG. 1. The administrator system may be implemented using, for example, one or more computers, servers, laptops, desktops, tablets, mobile phones, or other computing systems. In some examples, the admin system 158 may be wholly and/or partially implemented using one of the computing nodes of a distributed computing system described herein. However, in some examples (such as shown in FIG. 1), the admin system 158 may be a different computing system from the virtualized system and may be in communication with a CVM of the virtualized system (e.g., controller VM 108 of FIG. 1) using a wired or wireless connection (e.g., over a network).

Administrator systems described herein may host one or more user interfaces, e.g., user interface 160. The user interface may be implemented, for example, by displaying a user interface on a display of the administrator system. The user interface may receive input from one or more users (e.g., administrators) using one or more input device(s) of the administrator system, such as, but not limited to, a keyboard, mouse, touchscreen, and/or voice input. The user interface 160 may provide an input to controller VM 108 (e.g., to one or more HW interface services described herein). The input may be used to provide command for and/or a location of a hardware component described herein. The input may identify one or more hardware component(s) to control.

The user interface 160 may be implemented, for example, using a web service provided by the controller VM 108 or one or more other controller VMs described herein. In some examples, the user interface 160 may be implemented using a web service provided by controller VM 108 and information from controller VM 108 (e.g., from HW interface 150) may be provided to controller VM 108 for display in the user interface 160.

Examples of controller VMs described herein may provide a hardware interface service, such as HW interface 150 and HW interface 152 of FIG. 1. The hardware interface services may be implemented, for example, using software (e.g., executable instructions encoded in one or more computer readable media) to perform the functions of the hardware interface services described herein. The hardware interface services may generally translate generic commands for controlling hardware components into specific commands for the hardware component to be controlled.

For example, the controller VM 108 may receive a request to control hardware. The request to control the hardware may include a generic command intended for a particular HW component to be controlled. The generic command may be a variety of different types of generic commands. For example, the generic command may be a command to blink a light and/or obtain a sensor reading. The generic command may not be formatted for the particular hardware device to which it is directed. Instead, the generic command may be provided in a format and/or syntax used by the hardware interface service to receive generic commands.

The request to control hardware may include an identification of the hardware component to be controlled. The particular hardware component may be identified, for example, by its location (e.g., physical and/or logical location or other identification) in the virtualized system.

The request to control hardware may be provided, for example, from one or more user VMs (e.g., user VM 104 and/or user VM 108). In some examples, the request to control hardware may be provided by another computing system in communication with a hardware interface service described herein, such as the admin system 158 of FIG. 1. The request to control hardware may, for example, be provided through user interface 160 of FIG. 1.

Hardware interface services described herein may translate the generic command (e.g., a vendor-agnostic command) into a command specific for the intended hardware component. Accordingly, hardware interface services described herein may identify information about a particular hardware component, such as a type, model, and/or vendor. In some examples, that information may be provided together with the request to control the particular hardware component. However, in some examples, the particular hardware to be controlled may be identified by its location (e.g., physical and/or logical location) in the virtualized computing system. Hardware interface services described herein may access data in the virtualized computing system (e.g., in storage 140) which associates the location of the particular hardware component with details regarding the particular hardware component (e.g., type, model, and/or vendor).

The hardware interface services described herein may transform (e.g., translate) the generic command into a specific command for the particular HW component. For example, a plurality of hardware modules may be accessible to the hardware interface service. Referring to FIG. 1, hardware modules 146 may be accessible to hardware interface service 150. The hardware modules 146 are shown stored in local memory 142, however the hardware modules 146 may in some examples be stored in local storage 124 and/or elsewhere in the storage 140. The hardware modules 146 may include software code and/or other data that associates hardware functionality (e.g., vendor-specific functionality) with generic commands. In this manner, a hardware interface service may access a hardware module associated with the particular hardware component to be controlled. The hardware interface service may utilize the hardware module to translate the generic command into a specific command for the particular hardware component.

The hardware interface service may provide the specific command to the particular hardware component. For example, the hardware interface service 150 may access one or more hardware module(s) 146 to translate a generic command into a specific command for a particular one of the HW component(s) 162. The hardware interface service 150 may provide the specific command to the particular one of the HW component(s) 162. In some examples, the hardware interface service 150 may provide the specific command to the controller VM 108 which may in turn provide the specific command to the particular one of the HW component(s) 162.

Examples of systems described herein may include one or more setup services, such as setup service 154 and setup service 156 of FIG. 1. As shown in FIG. 1, setup services described herein may be provided as part of one or more controller VMs in a virtualized system. In some examples, all or portions of setup services may be provided on additional computing systems, such as admin system 158 of FIG. 1. Setup services described herein may include software code that causes the imaging, provisioning, configuring, and/or other setup of one or more computing nodes. In examples described herein, setup services may support the imaging of one or more computing nodes to include hardware modules appropriate for the computing node. For example, setup service 156 may, during an imaging process of the computing node 112, provide hardware modules 148 in the local memory 144 and/or other storage accessible to the computing node 112. Setup service 154 may, during an imaging process of the computing node 102, provide hardware modules 146 in the local memory 142 and/or other storage accessible to the computing node 102, such as local storage 124.

For example, during an imaging of the node 112, the setup service 156 may identify a type, vendor, version, and/or other identifying information regarding components of the computing node 112, including the operating system executed by the controller VM 118, and/or user VMs 114 and/or 116, the hypervisor 120, and/or the HW component(s) 164. Based on this identifying information, the setup service 156 may identify appropriate hardware modules for installation on the computing node 112. For example, hardware modules may be identified which translate generic commands into specific commands for one or more of the HW component(s) 164 and compatible with the operating system and/or hypervisor running on the computing node 112. The identified hardware modules may be selected from a module repository, such as module repository 166 in FIG. 1.

Examples of systems described herein may accordingly include module repositories. Module repositories, such as the module repository 166 of FIG. 1, may provide storage of multiple hardware modules described herein. The storage may accessible to computing nodes in a virtualized system, such as computing nodes 102 and 112 of FIG. 1. The storage of the module repository 166 may in some examples be located in storage 140, however in other examples, the module repository 166 may be stored in a location other than virtualized storage pool (e.g., storage 140). Setup services described herein may access the module repository and copy selected hardware modules to local storage and/or local memory of computing nodes during an imaging process. In this manner, hardware interface services at each computing node may have locally stored hardware modules for the particular hardware components, operating systems, and/or hypervisors present on the computing node. Vendors or other providers may have access to the module repository to create and/or update hardware modules.

Figure 2:
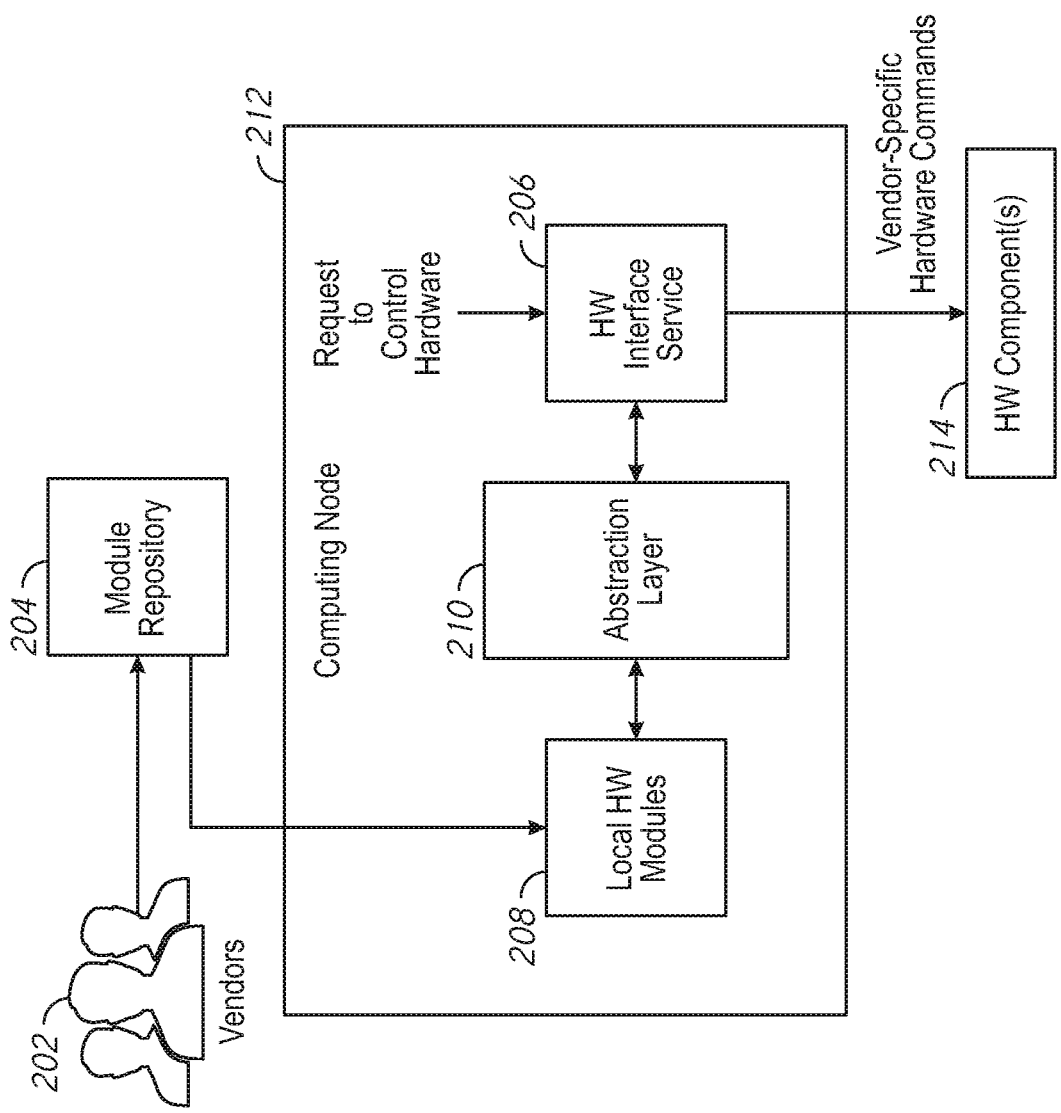
FIG. 2 is a flow diagram according to an embodiment.

FIG. 2 is a schematic illustration of a computing node having a hardware interface service arranged in accordance with examples described herein. FIG. 2 includes computing node 212 which may be used to implement and/or may be implemented by computing node 102 and/or 112 of FIG. 1 in some examples. FIG. 2 illustrates vendors 202, module repository 204, HW interface service 206, abstraction layer 210, local HW modules 208, and HW component(s) 214. Module repository 204, HW interface service 206, local HW modules 208, and HW component(s) 214 may be analogous to module repository 166, HW interface service 150, hardware modules 146, and HW component(s) 162 of FIG. 1 in some examples.

Vendors 202 (and/or others) may provide one or more hardware modules in module repository 204. At the time the computing node 212 is imaged and/or otherwise configured, local HW modules 208 may be provided at the computing node 212 from the module repository 204 (e.g., using a setup service described herein). During operation, a request to control hardware may be received by the HW interface service 206. The HW interface service 206 may interact with the local HW modules 208 through abstraction layer 210 to create vendor-specific hardware commands which may be provided to the HW components 214. The vendor-specific hardware commands may affect the request to control the hardware that was initially provided.

Accordingly, hardware interface services described herein may provide for a certain set of programming objects (e.g., programming code) specifying generic functionality to be selectively overridden or specialized (e.g., translated) by specialized programming objects (e.g., programming code) providing specific functionality. For example, the local HW modules 208 may be implemented using one or more HW component-specific (e.g., vendor-specific) software code (e.g., plug-ins). The abstraction layer 210 may be implemented using an API interface to the local HW modules 208 which facilitates translation between a generic command and the HW component-specific (e.g., vendor specific) software in the local HW modules 208.

Accordingly, a HW component-agnostic (e.g., vendor-agnostic) application programming interface (API) may be provided between VMs described herein and hardware modules. The hardware modules may include HW component-specific (e.g., vendor-specific) programming code and/or commands. Accordingly, VMs described herein (e.g., user VMs and/or controller VMs) may provide and/or receive requests to control hardware which include commands generic to one or more hardware components. The abstraction layer 210 may represent the transformation of the generic commands to the HW component-specific commands.

The programming code to perform the transformation may vary in implementation and/or location. In some examples, at least a portion of the abstraction layer 210 may be implemented in an API wrapper based on a RESTful API at instances of the local HW modules 208. For example, the local HW modules 208 themselves may incorporate the abstraction layer 210. Other API layer implementations such as function calls, and/or remote procedure calls and methods are possible. The generic hardware component commands transformed by the abstraction layer 210 may be used to control hardware, such as obtain sensor readings, and/or turn on and/or off lights (e.g., blink lights).

Figure 3:
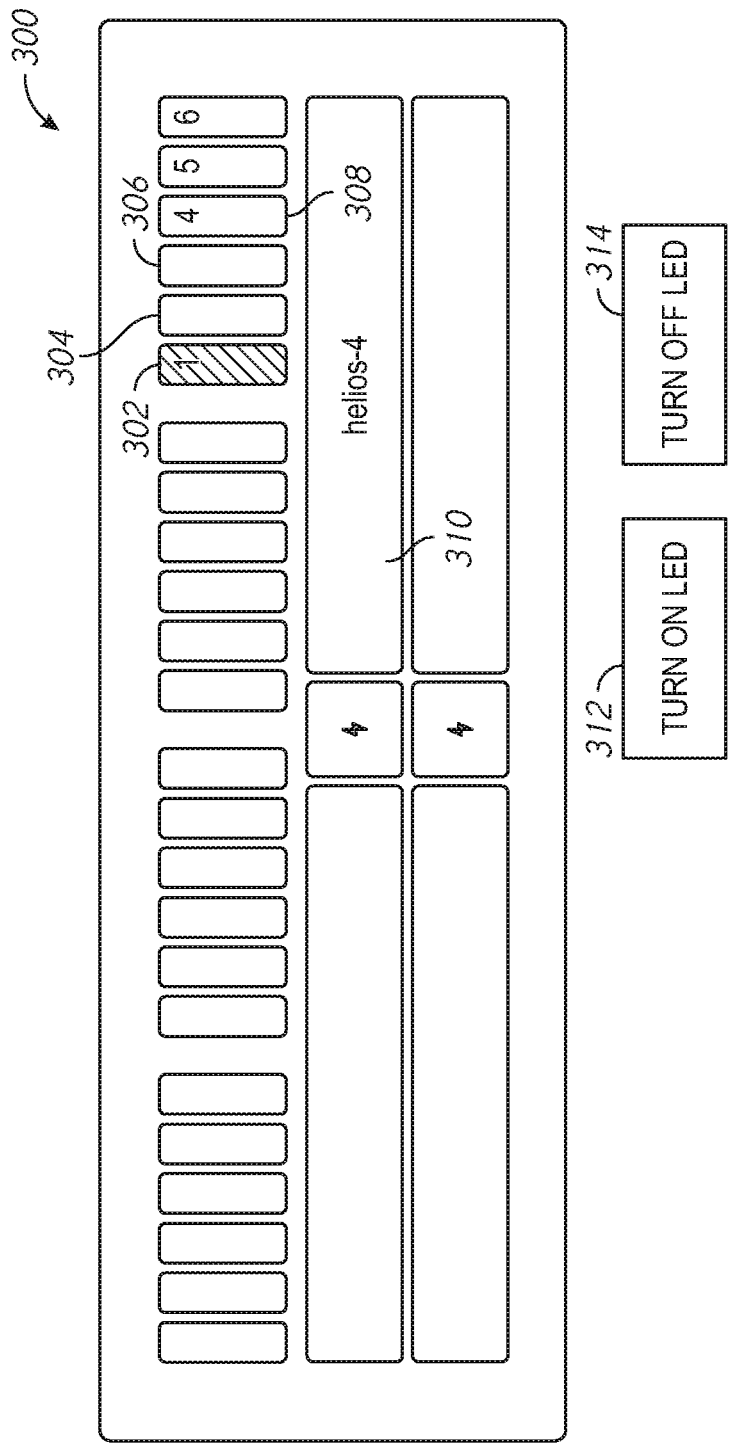
FIG. 3 is a screenshot of a portion of the distributed computing system according to an embodiment.

FIG. 3 is a schematic illustration of a user interface display arranged in accordance with examples described herein. In the example of FIG. 3, an enclosure 334 may include a display 300 configured to display a graphical representation of a computing system, for example, the computing system of FIG. 1. The display 300 may be presented on a user interface of an admin system described herein, such as the user interface 160 of FIG. 1. The graphical representation may include a first slot 302, a second slot 304, a third slot 306, a fourth slot 308, and a computing node 310. A The enclosure 334 includes the first slot 302, second slot 304, third slot 306, and fourth slot 308. Each of the first slot 302, second slot 304, third slot 306, and fourth slot 308 may include a storage device (e.g., a hard drive). For example, disks included in the storage 140 of FIG. 1 may be arranged in some or all of the slots shown in FIG. 3. One or more computing nodes may also be shown in the graphical representation, such as the computing node 310, referred to as "helios-4" in FIG. 3. The computing node 310 may be used to implement and/or may be implemented by the computing node 102 and/or 112 of FIG. 1 in some examples. In the example of FIG. 3, each of the storage devices which may correspond to the slots shown may include at least one LED. The LEDs may be hardware components which may be controlled in accordance with examples described herein.

In the example of FIG. 3, a turn on LED 312 and a turn off LED 314 may be buttons or other interface elements used to selectively turn on and turn off LEDs for the storage devices in the slots. In some examples, a storage device may be in need of attention (e.g., there may be an indication, from an automated system and/or from an operator), that a particular storage device may need to be checked, removed, upgraded, disposed of, or otherwise identified. It may be difficult in a data center containing a large volume of computing components to identify the particular storage device in need of attention. Accordingly, in examples described herein, it may be desirable to turn on and/or blink a light (e.g., an LED) on the particular storage device in need of attention.

To control the light on a particular storage device, referring to FIG. 3, a user (e.g., a system administrator) may view the graphical representation of the computing system. The user may select the storage device in need of attention (e.g., the storage device at slot 302). The storage device may be selected by, e.g., clicking, highlighting, typing an identification of the storage device, etc. In some examples, the storage device in need of attention may be selected by an automated process (e.g., software). The user may then cause a light to be turned on and/or off by selecting the buttons turn on LED 312 and/or turn off LED 314. In some examples, a button "blink LED" may be provided. These user inputs may provide a request to control the hardware—e.g., the request to control hardware provided to the HW interface service 206 in FIG. 2 and/or to HW interface service 150 and/or 156 of FIG. 1. The generic command to turn on, turn off, and/or blink an LED may be provided together with an indication of a location of the HW component. As described herein, a HW interface service may translate the generic command to turn on, turn off, and/or blink the LED into a specific command for the actual LED hardware present at the indicated location.

By indicating the location of the particular hardware component, delay may be reduced and/or avoided between the time at which a hardware problem occurs and the time at which a technician may locate the problematic hardware. As a result, administrators can become aware of the hardware problems in a timely manner, and take corrective action to replace or repair faulty equipment to increase performance efficiency and decrease operation costs.

Figure 4:
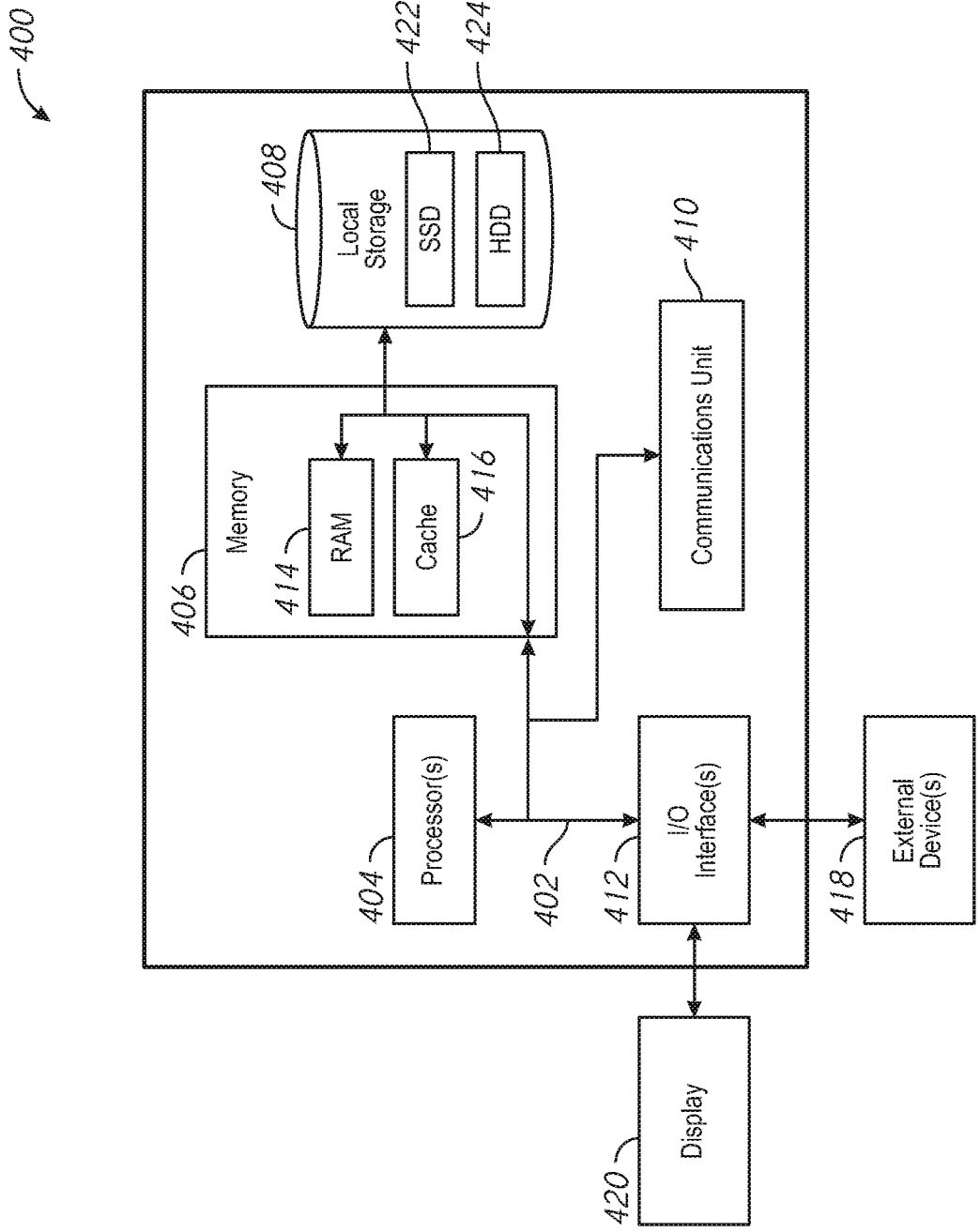
FIG. 4 is a block diagram of components of a computing node according to an embodiment.

FIG. 4 is a block diagram of components of a computing node according to an embodiment. It should be appreciated that FIG. 4 provides only an illustration of one implementation and does not imply any limitations with regard to the environments in which different embodiments may be implemented. Many modifications to the depicted environment may be made. For example, a computing node 400 may be implemented as the computing node 102 and/or computing node 112 (refer to FIG. 1).

The computing node 400 includes a communications fabric 402, which provides communications between one or more processor(s) 404, memory 406, local storage 408, communications unit 410, I/O interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses.

The memory 406 and the local storage 408 are computer-readable storage media. In this embodiment, the memory 406 includes random access memory RAM 414 and cache 416. In general, the memory 406 can include any suitable volatile or non-volatile computer-readable storage media. The local storage 408 may be implemented as described above with respect to local storage 124 and/or local storage 130. In this embodiment, the local storage 408 includes an SSD 422 and an HDD 424, which may be implemented as described above with respect to SSD 126, SSD 132 and HDD 128, HDD 134 respectively (refer to FIG. 1).

Various computer instructions, programs, files, images, etc. may be stored in local storage 408 for execution by one or more of the respective processor(s) 404 via one or more memories of memory 406. In some examples, local storage 408 includes a magnetic HDD 424. Alternatively, or in addition to a magnetic hard disk drive, local storage 408 can include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computing node 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention can be stored on such portable computer-readable storage media and can be loaded onto local storage 408 via I/O interface(s) 412. I/O interface(s) 412 also connect to a display 420.

Display 420 provides a mechanism to display data to a user and may be, for example, a computer monitor.

From the foregoing it will be appreciated that, although specific embodiments have been described herein for purposes of illustration, various modifications may be made while remaining with the scope of the claimed technology.

What is claimed is:

1. A system comprising:
a hardware component;
a computing node including a hypervisor, the computing node further comprising:
a controller virtual machine configured to run on the computing node and manage access to a storage pool;
a hardware interface service provided by the controller virtual machine, wherein the hardware interface service is configured to receive a location of the hardware component and a generic command intended for the hardware component,
wherein the hardware interface service is further configured to, based on the location of the hardware component, access data associated with the location of the hardware component the data comprising a type information, model information, vendor information, or combinations thereof of the hardware component,
and wherein the hardware interface service is configured to, based on the data associated with the location of the hardware component, translate the generic command into a specific command for the hardware component and provide the specific command to the hardware component.

2. The system of claim 1, wherein the hardware component comprises a light emitting diode (LED) light on a selected storage device.

3. The system of claim 2, wherein the generic command comprises a command to blink the LED light.

4. The system of claim 1, wherein the hardware interface service comprises an application programming interface (API) exposed to an operating system of the controller virtual machine.

5. The system of claim 1, wherein the hardware interface service is configured to receive the location of the hardware component from an admin system in communication with the computing node.

6. The system of claim 5, wherein the admin system is configured to display a graphical view of the storage pool, and wherein the hardware interface service is configured to receive the location of the hardware component responsive to a selection of a storage device in the graphical view.

7. The system of claim 1, wherein the hardware component comprises a sensor and the generic command comprises a request to get a sensor reading from the sensor.

8. The system of claim 1, wherein the location comprises a physical location, a logical location, or combinations thereof.

9. The system of claim 1, wherein the type information, the model information, the vendor information, or combinations thereof, is stored in a data store.

10. The system of claim 1 further comprising a plurality of hardware components, including the hardware component.

11. A method comprising:
receiving a generic request to control hardware in a distributed computing system;
providing the generic request to an application programming interface (API) of a hardware interface running on the controller virtual machine, including a location of the hardware;
receiving, from the hardware interface, a specific command for the hardware to effect the generic request, wherein the specific command is based at least on accessing data associated with the location of the hardware, wherein the data comprises type information, model information, vendor information, or combinations thereof, of the hardware; and
providing the specific command to the hardware to control the hardware.

12. The method of claim 11, wherein the hardware comprises a light emitting diode (LED) and the request to control the hardware comprises a request to blink the LED.

13. The method of claim 11, wherein the hardware interface is configured to provide vendor-specific hardware commands based on the location of the hardware.

14. The method of claim 11, further comprising, displaying, on a user interface in communication with the computing node, a graphical display of hardware components in the distributed computing system.

15. The method of claim 14, further comprising receiving the request to control hardware responsive to a selection of a hardware component in the graphical display.

16. The method of claim 11, wherein the hardware comprises a sensor, and the request to control the hardware comprises a request to obtain a sensor reading.

17. The method of claim 16, wherein the hardware comprises a fan speed sensor, and the request to control the hardware comprises a request to obtain a fan speed.

18. The method of claim 11, wherein the generic request is received at an operating system of a controller virtual machine operating on a computing node.

19. The method of claim 11, wherein the location comprises a physical location of the hardware, a logical location of the hardware, or combinations thereof.

20. The method of claim 11, wherein the generic request is translated, using the hardware interface, into the specific command based at least on accessing the type information, model information, vendor information, or combinations thereof, of the hardware.

21. A non-transitory computer readable medium encoded with executable instructions, which, when executed, cause a computing node to:
image software onto the computing node, including an operating system for a controller virtual machine;
identify a hypervisor running on the computing node and a hardware component accessible to the computing node; and
load a hardware interface specific to the hypervisor and the hardware component, the hardware interface configured to translate a generic request including a location to control the hardware component from the operating system into commands specific to the hypervisor and the hardware component, based at least on the hardware interface accessing data associated with the location, the data comprising type information, model information, vendor information, or combinations thereof.

22. The non-transitory computer readable medium of claim 21, wherein the hardware component comprises a light emitting diode (LED) light on a selected storage device.

23. The non-transitory computer readable medium of claim 22, wherein the generic request comprises a request to blink the LED light.

24. The non-transitory computer readable medium of claim 21, wherein the hardware interface comprises an application programming interface (API) exposed to the operating system.

25. The non-transitory computer readable medium of claim 21, wherein the hardware interface is configured to receive the generic request to control the hardware component including the location of the hardware component from an admin system in communication with the computing node.

26. The non-transitory computer readable medium of claim 21, wherein the hardware interface is configured to translate the generic request to control the hardware component from the operating system into a specific commands to the hypervisor and vendors of the hardware component.

27. The non-transitory computer readable medium of claim 21, wherein the controller virtual machine is configured to manage access to a storage pool by a user virtual machine running on the computing node.

28. The non-transitory computer readable medium of claim 21, wherein the operating system of the controller virtual machine is configured to provide the generic request to the API.

29. The non-transitory computer readable medium of claim 21, wherein the location comprises a physical location, a logical location, or combinations thereof.

* * * * *